United States Patent
Nurmi (10) Patent No.: US 8,933,879 B2
(45) Date of Patent: Jan. 13, 2015

(54) MOBILE COMMUNICATION TERMINAL AND METHOD THEREFORE

(75) Inventor: Mikko Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 1985 days.

(21) Appl. No.: 11/259,740

(22) Filed: Oct. 26, 2005

(65) Prior Publication Data

US 2007/0094617 A1    Apr. 26, 2007

(51) Int. Cl.
*G09G 5/00*    (2006.01)
*G06F 3/0484*    (2013.01)

(52) U.S. Cl.
CPC ................... *G06F 3/04842* (2013.01)
USPC ........... 345/157; 345/156; 345/173; 715/810; 715/856

(58) Field of Classification Search
USPC ........... 345/156–184; 715/810–845, 856–862
See application file for complete search history.

(56) References Cited

U.S. PATENT DOCUMENTS

| 6,664,989 | B1* | 12/2003 | Snyder et al. | 715/856 |
| 2004/0021694 | A1 | 2/2004 | Doar | 345/784 |
| 2004/0196260 | A1 | 10/2004 | Lin et al. | 345/161 |
| 2004/0201579 | A1* | 10/2004 | Graham | 345/175 |
| 2004/0233159 | A1* | 11/2004 | Badarneh | 345/156 |
| 2005/0057509 | A1 | 3/2005 | Mallett et al. | 345/163 |

* cited by examiner

*Primary Examiner* — Kevin M Nguyen
*Assistant Examiner* — Cory Almeida
(74) *Attorney, Agent, or Firm* — Alston & Bird LLP (57) ABSTRACT

A method, an electronic apparatus and a computer program product for controlling a cursor in a graphical user interface are disclosed. A direction signal is received from a cursor control device. Thereafter, a current mode is determined for said electronic apparatus in response to an actuation of an element of said GUI. After that, said direction signal is related to a set of predetermined directions, wherein said set of predetermined directions depends on said current mode. Next, said direction signal is classified into one direction of said set of predetermined directions, and, thereafter, said cursor is moved according to said one direction.

20 Claims, 5 Drawing Sheets

MOBILE COMMUNICATION TERMINAL AND METHOD THEREFORE

TECHNICAL FIELD

This invention relates to a method for, and an electronic apparatus with, improved controlling of a cursor in a Graphical User Interface (GUI), and a computer program product implementing said method.

BACKGROUND OF THE INVENTION

During the last decades, mobile terminals have become a common item for many people throughout the world. From being an item focused on telephone communication, the mobile terminals of today are more to be described as portable media and communication devices with, for instance, built-in camera, Internet access and many other communication services.

The new features set new demands on the usability of the mobile terminals. One important usability issue is cursor controlling. An easy and intuitive navigation, i.e. cursor controlling, may be decisive when a customer chooses a new mobile terminal. Therefore, it is of great importance for mobile terminal developers to take usability issues into account.

Another aspect is that the mobile terminals of today are used, due to the increased portability, under more difficult circumstances, regarding movements, shakes, cramped positions etc. Hence, a more robust control is necessary in order to provide an easy and precise cursor navigation.

In the early mobile terminals, navigation in menus and between different services was made with a number of buttons, e.g. an 'up' button and a 'down' button. Later on, due to more sophisticated services, a joystick was introduced, which supported a number of directions, in most cases at least 'up', 'down', 'right' and 'left'. Although the number of directions was increased for such a cursor control device, the applications of the mobile terminals were increasingly complex, which caused a number of new usability issues.

One of these issues was that the joystick, or other type of cursor control device, was too sensitive in some cases. For instance, when going through a drop-down menu, there was a not negligible risk of ending up outside the menu, i.e. not being able to steer the cursor straight, and hence exiting the menu unintentionally. However, in other cases, e.g. when drawing a figure, an as sensitive cursor control device as possible is preferable.

This problem is present for all electronic apparatuses having a display with a GUI (Graphical User Interface) and a cursor control device, such as a mobile terminal, a PDA (Personal Digital Assistant), a hand-held computer, a lap-top computer or a stationary computer.

A solution for improved usability is presented in US 2004/0021694, which discloses a computer implemented method for changing between a cursor control mode and a scroll control mode. The cursor control mode allowing a user to move a cursor in a graphical user interface (GUI) and the scroll control mode allows the user to scroll in the GUI. The cursor and scroll movements are based on positional data supplied by an input device such as a mouse.

This document mainly treats the problem associated with having a scroll controller and a cursor controller separated from each other.

SUMMARY OF THE INVENTION

In view of the above, an objective of the invention is to solve or at least reduce the problems discussed above. In particular, an objective is to enhance the cursor control in a GUI of an electronic apparatus, which in turn will improve the usability of the services provided by the electronic apparatus.

According to a first aspect, the invention is realized by a method for controlling a cursor in a graphical user interface (GUI) of an electronic apparatus having a display and a cursor control device, the method comprising receiving a direction signal from said cursor control device, determining a current mode for said electronic apparatus in response to an actuation of an element of said GUI, relating said direction signal to a set of predetermined directions, wherein said set of predetermined directions depends on said current mode, classifying said direction signal into one direction in said set of predetermined directions, and moving said cursor according to said one direction.

An advantage with this first aspect is that different modes of the electronic apparatus may have different cursor controlling. Hence, an optimized cursor control may be used for each mode of the apparatus.

In one of the embodiments of the first aspect, the set of predetermined directions is selected from a number of available sets of predetermined directions.

An advantage with having a number of available sets of predetermined directions is that different modes of the device can easily be mapped to one of the number of available sets.

Depending on the services provided by the device the number of available sets of predetermined directions can vary. In one the embodiments of the first aspect two different available sets is suitable, in another embodiment three is suitable, and in still another embodiment four is suitable. Even more than four different sets may be available for some embodiments.

In one embodiment of the first aspect, each of said sets of predetermined directions comprises a different number of predetermined directions.

In one embodiment of the first aspect, the number of directions in said set of predetermined directions depends on said current mode and may be of the type $2^n$, where n is a positive integer. An advantage with this embodiment is that the directions are easy to represent digitally.

Further, in the above mentioned method the actuated element of said GUI can be a drop-down menu.

Additionally, in this embodiment, the set of predetermined directions advantageously comprises four directions, where first and second directions are for navigating among menu items of said drop-down menu, and third and fourth directions are for exiting said drop-down menu.

The set of predetermined directions in this or other embodiments can also comprise at least three directions, first and second directions being for navigating among menu items of said drop-down menu, and a third direction being for opening a sub-menu of said drop-down menu. In one embodiment, this is combined with what is stated in the immediately preceding paragraph above, so that first and second predetermined directions are for navigating among menu items in a drop-down menu, whereas a third direction is for openening a sub-menu of the drop-down menu, if available, or otherwise for exiting the drop-down menu.

Additionally, the above mentioned method can further involve steps of determining a force feedback which has been predefined for said one direction classified in said step of classifying, and performing said force feed back.

An advantage with having a force feedback associated with certain directions is that the user is clearly informed when a specific direction, e.g. combined with leaving the drop-down menu, is chosen. Such a clear user feedback both simplifies and speeds up the usage.

According to a second aspect, the invention is realized by an electronic apparatus comprising a display, a graphical user interface (GUI) and a cursor control device, the apparatus further comprising a GUI controller including a receiver for receiving a direction signal from said cursor control device, a mode determinator for determining a current mode for said electronic apparatus in response to an actuation of an element of said GUI, a relater for relating said direction signal to a set of predetermined directions, wherein said set of predetermined directions depends on said current mode, a classifier for classifying said direction signal into one direction of said set of predetermined directions, and a cursor mover for moving a cursor according to said one direction.

In one of the embodiments of this second aspect, the electronic apparatus is a mobile terminal.

In other embodiments of this second aspect, the electronic apparatus is a PDA (personal digital assistant), a hand-held computer, a lap-top computer, or a stationary computer.

According to a third aspect, the invention is realized by a computer program product when downloaded to and executed on a processor is arranged to perform the steps of any of the methods described above.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objectives, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

The present invention is, as mentioned above, within the field of cursor control in a GUI. In a mobile telecommunications system, as being illustrated in FIG. 6, the GUI is preferably presented in the display of a terminal 600, 606. However, the invention is intended not only for mobile terminals, it may also be utilized in all devices having a display with a GUI (Graphical User Interface).

Figure 1:
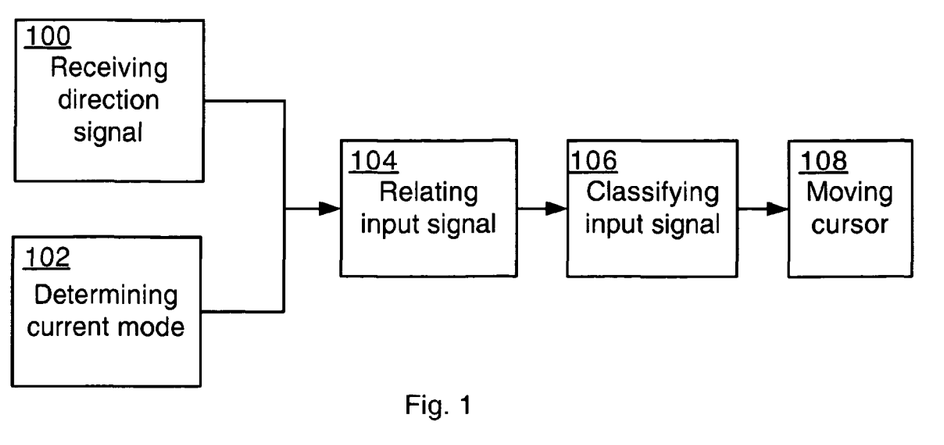
FIG. 1 is a flow chart which generally illustrates a method for controlling a cursor according to the present invention.

The main steps of the method for controlling the cursor are diagrammatically illustrated in FIG. 1. The user triggers a direction signal, e.g. by moving a joystick, and the direction signal is received in step 100. When the direction signal is received, the current mode of the electronic apparatus is also determined in step 102. The mode may, for instance, be 'drop-down menu open'. The mode of the electronic apparatus may be determined right after the direction signal has been received, or continuously and independently of the reception of the direction signal.

After having received a direction signal and determined the current mode of the electronic apparatus, the direction signal is related to a set of predetermined directions in step 104. If, for example, the current mode is "drop-down menu open", a set which comprises only the four directions 'up', 'down', 'left' and 'right', where 'up' and 'down' scroll the menu upwards and downwards, respectively, and 'left' and 'right' exit the menu, will be related to the direction signal.

In order to inform the user that, for instance, the drop-down menu will be exited in response to actuation in the 'left' or 'right' direction, a force feedback, such as a vibration signal, may be performed by the electronic apparatus.

After having related a set of predetermined directions to the direction signal, the direction signal is classified in step 106 into one of the predetermined directions included in the set derived in step 104.

Finally, the cursor is moved according to the classified one direction in the set of predetermined directions in step 108. It is to be noted that the invention is not limited to any particular cursor design, appearance or behaviour; hence, moving a cursor may pertain to various different activities, including but not limited to repositioning an arrow-like symbol, changing focus between different GUI elements, etc.

In FIGS. 2A through 2D, four different sets of predetermined directions are illustrated as examples. A person skilled in the art will realize that each set of predetermined directions may be divided into more or fewer number of directions than shown in FIGS. 2A-2D, and that even if the number of directions is the same for the two sets, the individual directions included in each set may be different.

Figure 2A:
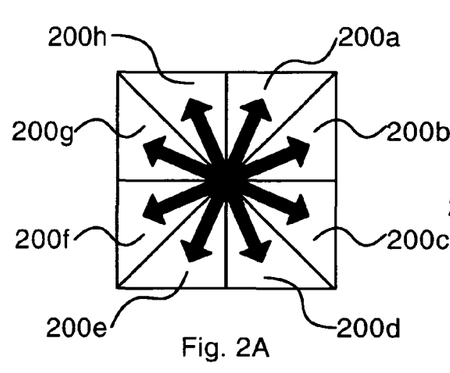
FIGS. 2A-2D illustrates examples of different sets of predetermined directions.

In FIG. 2A, eight different directions are possible, illustrated by 200a through 200h. This set of predetermined directions has the advantage of supporting many directions input by the user, which enhances the usability when, for example, drawing a picture. However, a drawback with this set of predetermined directions is that there is a risk that the cursor ends up outside the menu when scrolling a drop-down menu, or in other cases in a GUI, where a straight cursor steering is desired. The reason for this is that the many directions make it more difficult to navigate the cursor straight.

Figure 2B:
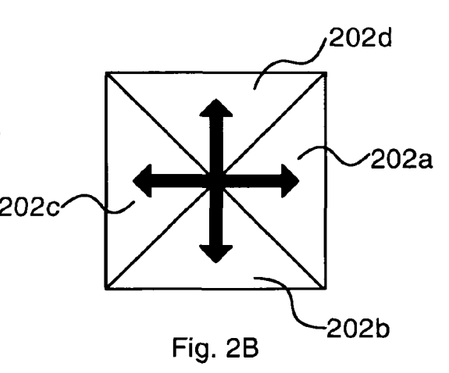

By relating the received direction signal to a set of predetermined directions as illustrated in FIG. 2B when navigating a drop-down menu, i.e. when the current mode of the apparatus is 'drop-down menu open', the aforementioned drawback associated with the set of predetermined directions illustrated in FIG. 2A is avoided. The reason is that in the set illustrated in FIG. 2B, only the four directions 'up', 'down', 'left' and 'right' are possible. The 'up' and 'down' directions are utilized to navigate the menu, and the 'left' and 'right' are utilized to exit the menu.

Many cursor control devices, e.g. mice and trackballs, are made to support every possible direction between −180° and 180° (subject to the angular resolution provided by the cursor control device). In order to restrict the number of possible directions a mapping must be performed between an actual direction and a mapped direction.

If one of the above mentioned cursor control devices is restricted to the directions illustrated in FIG. 2A, actual directions in the range 0° to 45°, illustrated as the segment 200b, are mapped into a direction 22.5°, and, accordingly, actual directions in the range 45° to 90°, illustrated as the segment 200a, are mapped into a direction 67.5°, and in similar manners for the other segments.

However, if one of the above mentioned cursor control devices is restricted to the directions illustrated in FIG. 2B, actual directions in the range −45° to 45°, illustrated as the segment 202a, are mapped into a direction 0°, and, accordingly, actual directions in the range 45° to 135°, illustrated as the segment 202d, are mapped into a direction 90°, and in similar manners for the other segments.

Figure 2C:
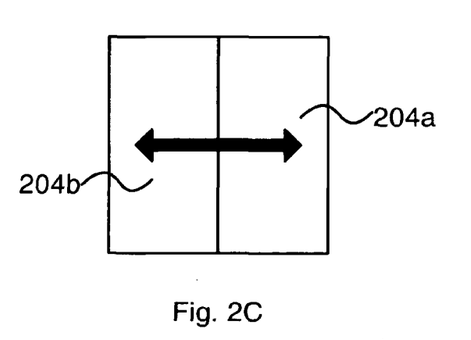

In FIG. 2C, another possible set of predetermined directions is illustrated. In this set only the directions 'left' and 'right' are possible. Such a set of predetermined directions may be utilized e.g. when adjusting a brightness control element in the GUI or when playing a certain game.

Figure 2D:
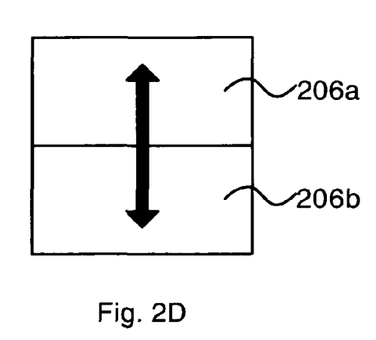

Yet another possible set of predetermined directions is illustrated in FIG. 2D. In this set only the directions 'up' and 'down' are utilized. This set may e.g. be utilized when adjusting a volume control element in the GUI of the electronic apparatus.

Figure 3:
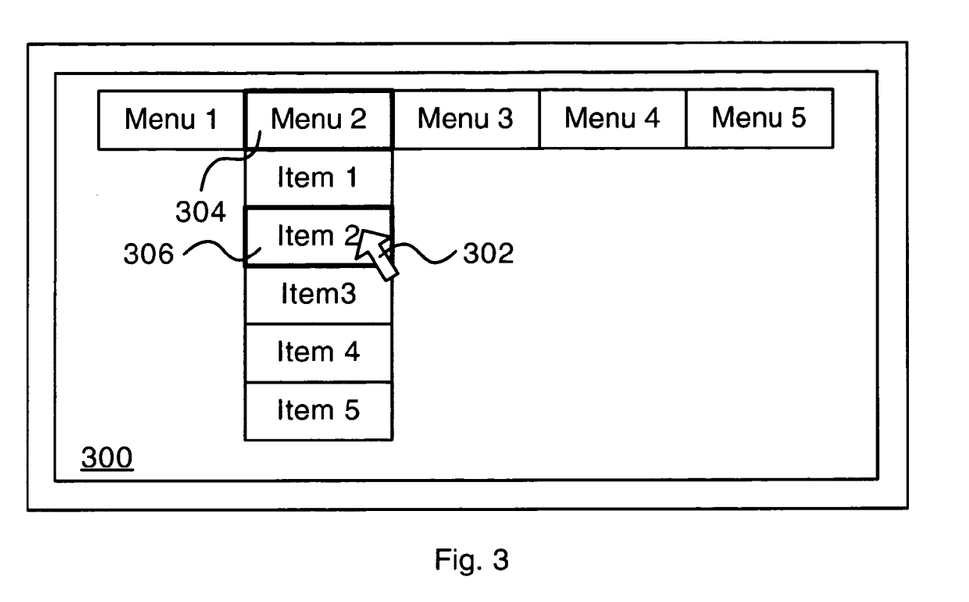
FIG. 3 illustrates a GUI, wherein a drop-down menu is opened.

In FIG. 3, an example of a common GUI situation is illustrated. Five drop-down menu headers are positioned next to each other in the upper part of the display. When clicking, or in other way activating, one of these menu headers, a drop-down menu will be opened.

At first, in this example, the set of predetermined directions is set to the one illustrated in FIG. 2A, hence eight different directions is possible for cursor navigation and the user can quite freely navigate the cursor. Alternatively, the current mode may be a default or "uncontrolled" mode, where the set of predetermined directions is equal to the maximum and virtually unlimited number of nominal directions for a high-resolution cursor control device, such as a mouse.

When the user activates one of the menus, for instance by clicking on menu header 304, the items contained in this menu is shown, as is commonly indicated at 306. The cursor is indicated at 302. At the same time, the current mode of the device is set to 'drop-down menu open' and, because of this, the set of predetermined directions is changed to the one illustrated in FIG. 2B.

With the cursor navigation restricted to the directions illustrated in FIG. 2B, the user may easily navigate the menu with less risk of ending up beside the menu, and, because of this, closing the menu unintentionally.

A common way for navigating a drop-down menu is namely to choose between the contained items in the menu with 'up' and 'down', and exiting the menu with 'right' or 'left'.

Figure 4:
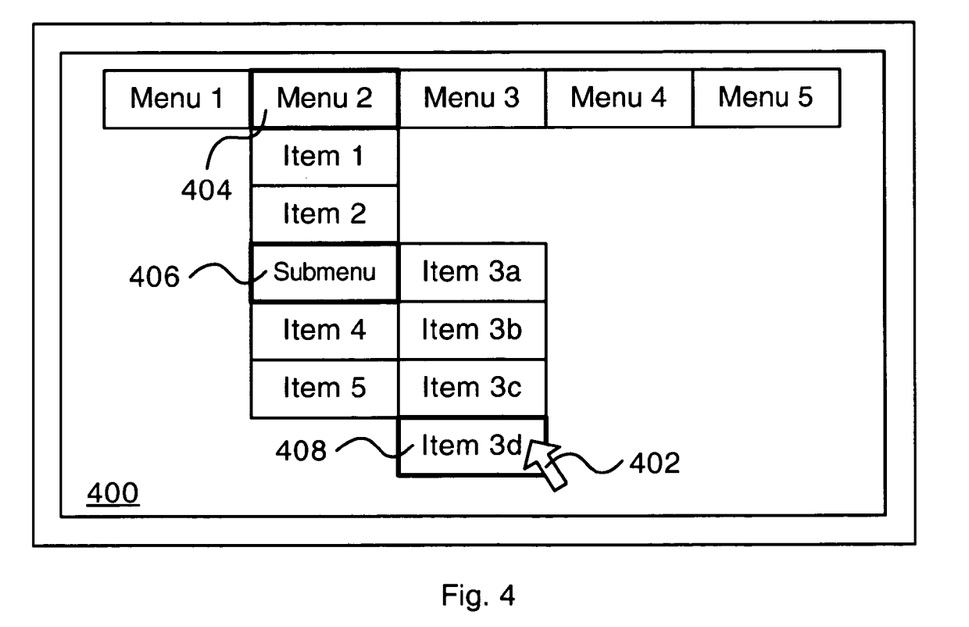
FIG. 4 illustrates a GUI, wherein a sub-menu within a drop-down menu is opened.

Even if the menu contains sub-menus the aforementioned method will function. In FIG. 4 another common GUI situation is shown. As in the case illustrated in FIG. 3, the user has opened the menu header 404 ('Menu 2'), and the set of predetermined directions was shifted from e.g. the one illustrated in FIG. 2A to the one illustrated in FIG. 2B. However, in this case the item 406 ('Item 3') in the menu is replaced by a submenu. The submenu is, in this example, opened by having the cursor 402 positioned at the submenu 406 and navigating the cursor to the right. This procedure is easily done with the number of directions restricted to four, as in FIG. 2B. When having opened the sub-menu a new drop-down menu is opened, as illustrated in FIG. 4, where the cursor 402 is positioned at the lowermost item 408 ('Item 3d').

Figure 5:
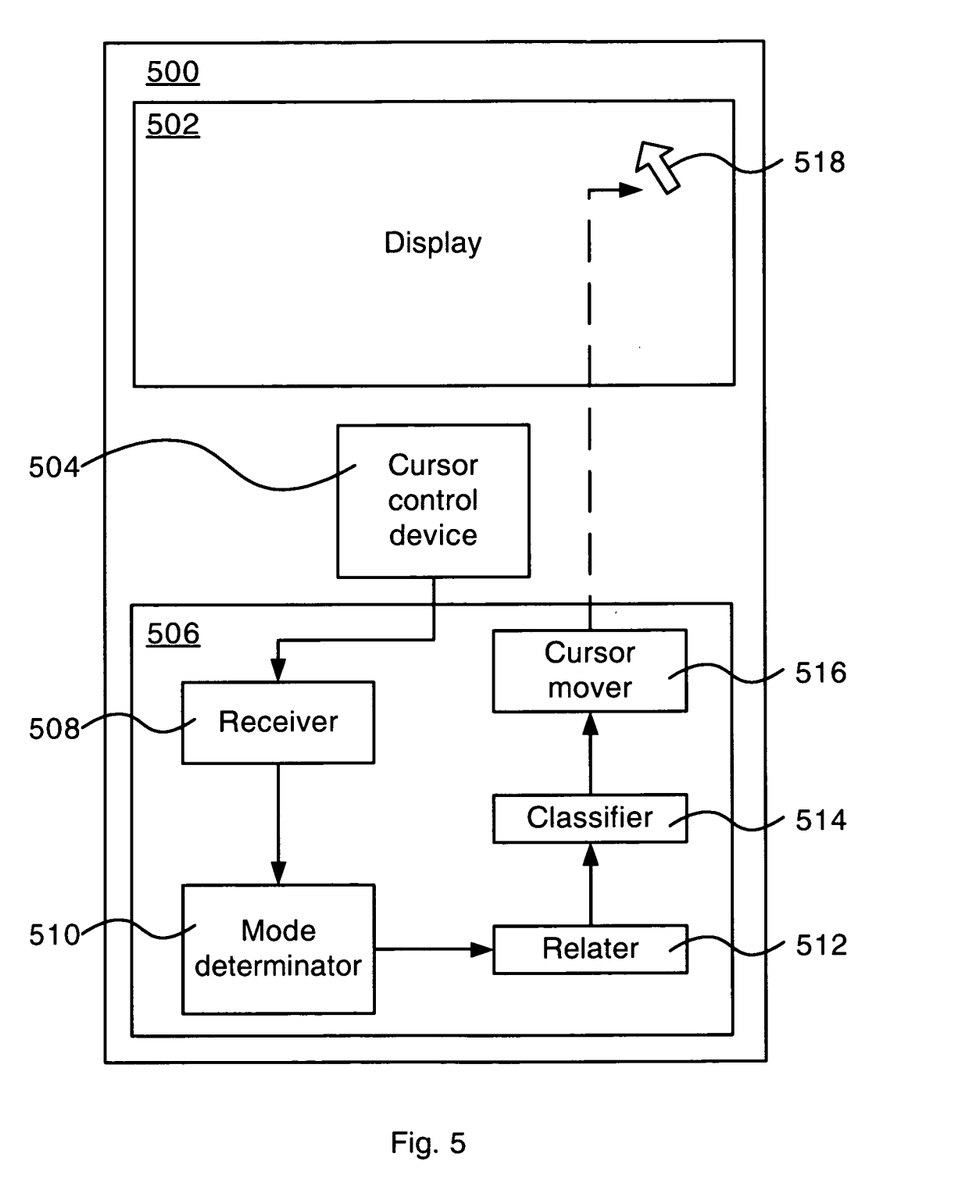
FIG. 5 diagrammatically illustrates an electronic apparatus according to the present invention.

In FIG. 5 a block diagram of an electronic apparatus 500 is shown, having a display 502 and a GUI with a cursor 518 and supporting the method described above. The direction signal from a cursor control device 504 is received by a receiver 508. The cursor control device 504 may for instance be a joystick, trackball, touchpad, mouse, or any other input device by means of which a user of the apparatus 500 may control the cursor 518 in different directions. A mode determinator 510 determines a current mode of the electronic apparatus, which e.g. is 'drop-down menu open'.

A relater 512 relates the direction signal to a set of predetermined directions, wherein the set of predetermined directions is dependent of the current mode of the device. Thereafter, a classifier 514 will associate the direction signal to one of the directions in the set of predetermined directions, as explained above. According to the direction chosen by the classifier, a cursor mover 516 moves the cursor 518.

The receiver 508, the mode determinator 510, the relater 512, the classifier 514 and the cursor mover 516 can generally be referred to as a GUI controller 506.

Figure 6:
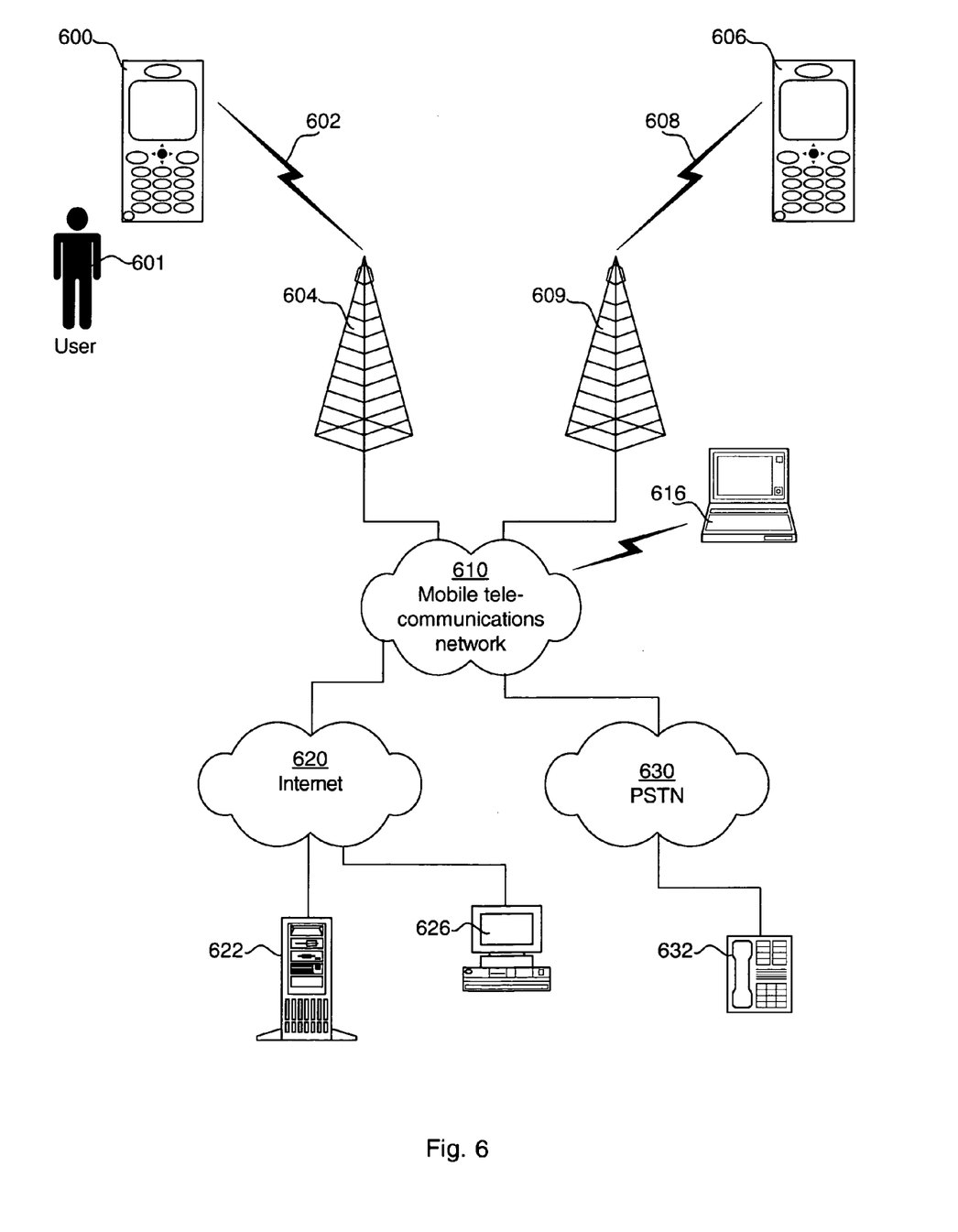
FIG. 6 is a schematic illustration of a telecommunications system, including a mobile terminal and a mobile telecommunications network, as an example of an environment in which the present invention may be applied.

FIG. 6 illustrates one example of a telecommunications system in which the invention may be applied. In the telecommunications system of FIG. 6, various telecommunications services such as voice calls, data calls, facsimile transmissions, music transmissions, still image transmissions, video transmissions, electronic message transmissions and electronic commerce may be performed to and from different mobile terminals 600, 606.

The mobile terminals 600, 606 are connected to a mobile telecommunications network 610 through RF links 602 and 608 via respective base stations 604, 609. The mobile telecommunications network 610 may belong to any commercially available mobile telecommunications system, in compliance with standards such as GSM, UMTS, D-AMPS, CDMA2000, FOMA or TD-SCDMA. The mobile terminals 600, 606 are illustrated as mobile (cellular) terminals but may alternatively be other kinds of portable devices, such as personal digital assistants or computers 616.

A public switched telephone network (PSTN) 630 is connected to the mobile telecommunications network 610 in a familiar manner. Various terminals 632 are connected to the PSTN 630.

The mobile telecommunications network 610 is operatively connected to a wide area network 620, which may be Internet or a part thereof. Various server computers 622 and client computers 626 may be connected to the wide area network 620.

Figure 7:
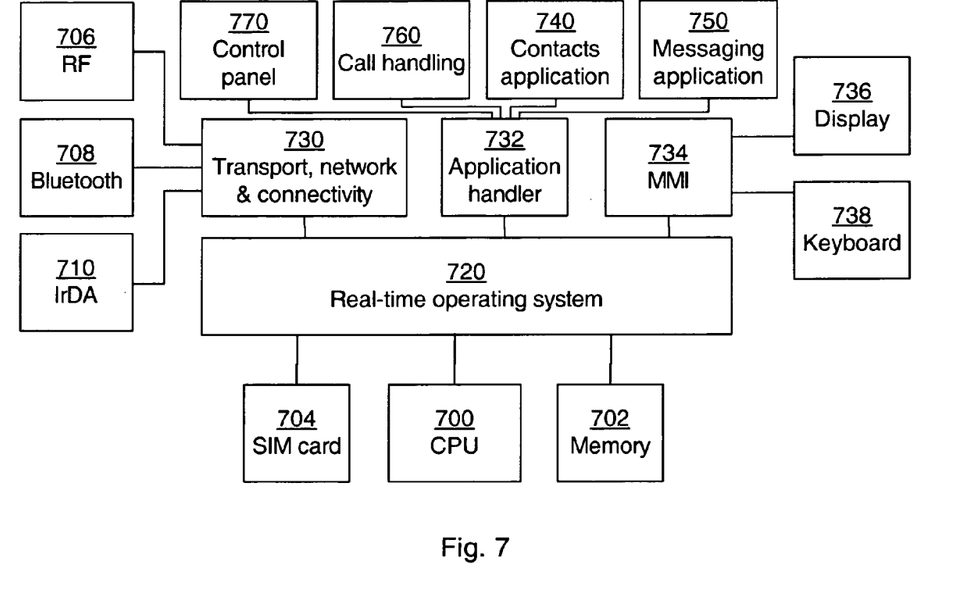
FIG. 7 is a schematic block diagram illustrating a mobile terminal according to one embodiment.

As seen in FIG. 7, the mobile terminal 600 has a controller 700 which is responsible for the overall operation of the mobile terminal and is preferably implemented by any commercially available CPU ("Central Processing Unit"), DSP ("Digital Signal Processor") or any other electronic programmable logic device. The controller 700 has associated electronic memory 702 such as RAM memory, ROM memory, EEPROM memory, flash memory, or any combination thereof. The memory 702 is used for various purposes by the controller 700, one of them being for storing data and program instructions for various software in the mobile terminal. The software includes a real-time operating system 720, man-machine interface (MMI) drivers 734, an application handler 732 as well as various applications. The applications may include a contacts (phonebook) application 740, a messaging application 750, a call handling application 760 and a control panel application 770, as well as various other applications. The MMI drivers 734 cooperate with conventional MMI or input/output (I/O) devices, including a display 736 (such as display 502 of FIG. 5.) and a keyboard 738 as well as various other I/O devices such as a microphone, a speaker, a vibrator, a cursor control device (such as 504 of FIG. 5.), a ringtone generator, an LED indicator, etc. As is commonly known, a user may operate the mobile terminal through the man-machine interface thus formed. The GUI controller 506 of FIG. 5 may be implemented by the MMI drivers 734 and/or the operating system 720.

The software also includes various modules, protocol stacks, drivers, etc., which are commonly designated as 730 and which provide communication services (such as transport, network and connectivity) for an RF interface 706, and optionally a Bluetooth interface 708 and an IrDA interface 710. The RF interface 706 comprises an internal or external antenna as well as appropriate radio circuitry for establishing and maintaining a wireless link to a base station (e.g. the link 602 and base station 604 in FIG. 6). As is well known to a man skilled in the art, the radio circuitry comprises a series of analogue and digital electronic components, together forming a radio receiver and transmitter. These components include, inter alia, band pass filters, amplifiers, mixers, local oscillators, low pass filters, AD/DA converters, etc.

The mobile terminal also has a SIM card 704 and an associated reader. As is commonly known, the SIM card 704 comprises a processor as well as local work and data memory.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method comprising:
receiving, from a cursor control device of an electronic apparatus having a display, a direction signal indicating cursor movement to be performed across the display;
determining, with a controller, a current mode of the apparatus, wherein the mode has a set of predetermined directions associated therewith, the set of predetermined directions being restricted to a subset of directions of the cursor movement, the set of predetermined directions still allowing for cursor movement to enable user-selection of one or more functions provided by the current mode;
relating the direction signal to the set of predetermined directions associated with the current mode by classifying the cursor movement, as indicated by the direction signal, into a corresponding one of the predetermined directions; and
performing cursor movement in the corresponding one predetermined direction in response to continued detection of cursor movement corresponding to the classified predetermined direction so as to enable the user-selection of the one or more functions provided by the current mode.

2. The method according to claim 1, wherein said set of predetermined directions is selected from a number of available sets of predetermined directions.

3. The method according to claim 1, wherein each of said sets of predetermined directions comprises a different number of predetermined directions.

4. The method according to claim 1, wherein said set of predetermined directions contains a number of directions and wherein said number depends on said current mode.

5. The method according to claim 4, wherein said number of directions in said set of predetermined directions is of the type $2^n$, where n is a positive integer.

6. The method according to claim 1, further comprising determining a force feedback which has been predefined for said one direction and performing said force feedback.

7. The method according to claim 1, wherein the determining is performed in response to actuation of a graphic user interface (GUI) of the apparatus, and said actuated element of said GUI is a drop-down menu.

8. The method according to claim 7, wherein said set of predetermined directions comprises four directions, first and second directions being for navigating among menu items of said drop-down menu, and third and fourth directions being for exiting said drop-down menu.

9. The method according to claim 7, wherein said set of predetermined directions comprises at least three directions, first and second directions being for navigating among menu items of said drop-down menu, and a third direction being for opening a sub-menu of said drop-down menu.

10. An electronic apparatus comprising a controller and a memory including program instructions, the memory and the program instructions configured to, with the controller, cause the apparatus to:
receive a direction signal from a cursor control device, wherein the direction signal is indicative of cursor movement to be performed across a display;
determine a current mode for the apparatus, wherein the mode has a set of predetermined directions associated therewith, the set of predetermined directions being restricted to a subset of directions of the cursor movement, the set of predetermined directions still allowing for cursor movement to enable user-selection of one or more functions provided by the current mode;
relate said direction signal to the set of predetermined directions associated with the current mode by classifying the cursor movement, as indicated by said direction signal, into a corresponding one of the predetermined directions; and
move the cursor in the corresponding one predetermined direction in response to continued detection of cursor movement corresponding to the classified predetermined direction so as to enable the user-selection of the one or more functions provided by the current mode.

11. The electronic apparatus according to claim 10, wherein said electronic apparatus is a mobile terminal.

12. The electronic apparatus according to claim 10, wherein said electronic apparatus is a personal digital assistant (PDA).

13. The electronic apparatus according to claim 10, wherein said electronic apparatus is a hand-held computer.

14. The electronic apparatus according to claim 10, wherein said electronic apparatus is a lap-top computer.

15. The electronic apparatus according to claim 10, wherein said electronic apparatus is a stationary computer.

16. A computer program product stored in a memory, the computer program product comprising computer readable code, which when downloaded to and executed on a processor, is configured to execute the method of claim 1.

17. The method of claim 7 wherein the predetermined set of directions corresponding to the drop-down menu comprises left, right, up and down directions.

18. The method of claim 1 wherein the cursor is moved freely in the one direction.

19. The method of claim 1 further comprising generating a notification when a boundary of the determined current mode is exited as the cursor moves in the one direction.

20. The method of claim 1 further comprising:
- detecting a change in the current mode of the apparatus as the cursor moves in the one direction, the detected changed mode having another set of predetermined directions associated therewith;
- relating the direction signal to the another set of pre-determined directions associated with the detected changed mode by classifying the cursor movement into a corresponding another direction from the another set of pre-determined directions; and
- performing cursor movement in the corresponding another predetermined direction in response to continued detection of cursor movement corresponding to the classified another predetermined direction so as to enable the user-selection of the one or more functions provided by the detected changed mode.

\* \* \* \* \*